US012377970B2

(12) United States Patent
Ishikawa et al.

(10) Patent No.: US 12,377,970 B2
(45) Date of Patent: Aug. 5, 2025

(54) FLIGHT DEVICE WITH FIRST MAIN ROTOR AND SECOND MAIN ROTOR ARRANGED BELOW SUB-ROTOR

(71) Applicant: ISHIKAWA ENERGY RESEARCH CO., LTD., Ota (JP)

(72) Inventors: Mitsuru Ishikawa, Ota (JP); Takahito Sekita, Ota (JP)

(73) Assignee: ISHIKAWA ENERGY RESEARCH CO., LTD., Ota (JP)

( * ) Notice: Subject to any disclaimer, the term of this patent is extended or adjusted under 35 U.S.C. 154(b) by 55 days.

(21) Appl. No.: 18/683,158

(22) PCT Filed: Oct. 6, 2022

(86) PCT No.: PCT/JP2022/037466
§ 371 (c)(1),
(2) Date: Feb. 12, 2024

(87) PCT Pub. No.: WO2023/079900
PCT Pub. Date: May 11, 2023

(65) Prior Publication Data
US 2024/0343423 A1    Oct. 17, 2024

(30) Foreign Application Priority Data

Nov. 8, 2021   (JP) .................................. 2021-182053

(51) Int. Cl.
*B64U 50/10*      (2023.01)
*B64U 10/16*      (2023.01)
(52) U.S. Cl.
CPC ............. *B64U 50/10* (2023.01); *B64U 10/16* (2023.01)

(58) Field of Classification Search
None
See application file for complete search history.

(56) References Cited

U.S. PATENT DOCUMENTS

2015/0274286 A1* 10/2015  Kereth ................... B64C 27/12
                                                    244/17.21
2019/0263519 A1*  8/2019  Argus .................... B64U 10/13
(Continued)

FOREIGN PATENT DOCUMENTS

CN      105836131 A     8/2016
CN      110422020 A    11/2019
(Continued)

OTHER PUBLICATIONS

International Search Report dated Nov. 22, 2022, issued in counterpart International Application No. PCT/JP2022/037466, with English Translation. (5 pages).

(Continued)

*Primary Examiner* — Arfan Y. Sinaki
(74) *Attorney, Agent, or Firm* — WHDA, LLP

(57) ABSTRACT

A flight device that can accurately perform attitude control with a sub-rotor is provided. The flight device 10 includes an airframe 19, an engine 30, motors 21, main rotors 14, and sub-rotors 15. The engine 30 rotates the main rotors 14. The motors 21 rotate the sub-rotors 15. The main rotors 14 are arranged below the sub-rotors 15. In the flight device 10, arranging the main rotors 14 below the sub-rotors 15 prevents the sub-rotors 15 from being affected by an air flow generated by rotation of the main rotors 14. Accordingly, the sub-rotors 15 can provide thrusts as designed by being rotated, and the position and the attitude of the airframe 19 can be accurately adjusted.

6 Claims, 4 Drawing Sheets

(56) References Cited

U.S. PATENT DOCUMENTS

| | | |
|---|---|---|
| 2020/0130822 A1 | 4/2020 | Dong |
| 2021/0016880 A1 | 1/2021 | Ishikawa et al. |
| 2022/0267000 A1* | 8/2022 | Zhang .................... H04N 7/185 |

FOREIGN PATENT DOCUMENTS

| | | |
|---|---|---|
| CN | 210882652 U | 6/2020 |
| JP | 2011-251678 A | 12/2011 |
| JP | 2012-51545 A | 3/2012 |
| JP | 2014-240242 A | 12/2014 |
| JP | 2019-59362 A | 4/2019 |
| JP | 2021-20674 A | 2/2021 |

OTHER PUBLICATIONS

Written Opinion of the International Searching Authority (Form PCT/ISA/237) dated Nov. 22, 2022, issued in counterpart International Application No. PCT/JP2022/037466. (4 pages).

International Preliminary Report on Patentability (Form PCT/IPEA/409) of International Application No. PCT/JP2022/037466 dated Mar. 20, 2023. (9 pages).

Notice of Reasons for Refusal dated Nov. 30, 2021, issued in counterpart of Japanese Patent Application No. 2021-182053, with English Translation. (7 pages).

\* cited by examiner

FLIGHT DEVICE WITH FIRST MAIN ROTOR AND SECOND MAIN ROTOR ARRANGED BELOW SUB-ROTOR

TECHNICAL FIELD

The present invention relates to a flight device, and relates particularly to a so-called parallel hybrid flight device in which a main rotor is drivingly driven by an engine and a sub-rotor is rotated by a motor.

BACKGROUND ART

An unmanned flight device capable of flying in the air has been conventionally known. Such a flight device can fly in the air by using thrusts of rotors that rotate about vertical axes.

For example, the field of transport, the field of surveying, the field of imaging, and the like are conceivable as the fields to which such a flight device is applied. When the flight device is applied to such fields, a surveying device or an imaging device is attached to the flight device. Applying the flight device to such fields enables transport, imaging, and surveying to be performed in a region in which a person cannot enter by causing the flight device to fly in such regions. Inventions relating to such a flight device are described in, for example, Patent Literature 1 and Patent Literature 2.

In a general flight device, the above-mentioned rotors are rotated by electric power supplied from a storage battery mounted in the flight device. However, since a supply amount of energy is not always sufficient in the supply of electric power by the storage battery, a flight device carrying an engine has appeared to achieve continuous flight over a long period. In such a flight device, a power generator is rotated by drive force of the engine, and the rotors are rotationally driven by electric power generated by this power generator. Since the engine and the power generator are connected in series in a path in which energy is supplied from a power source to the rotors, the flight device with such a configuration is also referred to as series drone. Performing imaging and surveying by using such a flight device enables imaging and surveying to be performed over a wide area. For example, Patent Literature 3 describes a flight device carrying an engine.

PRIOR ART LITERATURES

Patent Literatures

Patent Literature 1: Japanese Patent Application Publication No. 2012-51545
Patent Literature 2: Japanese Patent Application Publication No. 2014-240242
Patent Literature 3: Japanese Patent Application Publication No. 2011-251678

SUMMARY OF THE INVENTION

Problems to be Solved by the Invention

However, in the prior flight devices described above, there is a room for improvement in a mechanism of a drive system.

Specifically, as described above, in the parallel hybrid drone, an air frame is lifted into the air by lift generated by rotation of the main rotor, and the position and the attitude of the airframe is controlled by lift generated by rotation of the sub-rotor.

In this case, the rotation of the main rotor generates strong downwash below the main rotor. Accordingly, when the sub-rotor is arranged below the main rotor, there occurs a problem that the sub-rotor is affected by the downwash, and the attitude control of the airframe by the rotation of the sub-rotor cannot be accurately performed.

The present invention has been made in view of the above-mentioned circumstances, and an object of the present invention is to provide a flight device that can accurately perform attitude control by using a sub-rotor.

Means for Solving the Problems

A flight device of the present invention includes an airframe, an engine, a motor, a main rotor, and a sub-rotor, the engine rotates the main rotor, the motor rotates the sub-rotor, and the main rotor is arranged below the sub-rotor.

Effects of the Invention

In the flight device of the present invention, arranging the main rotor below the sub-rotor prevents the sub-rotor from being affected by an air flow generated by rotation of the main rotor. Thus, the sub-rotor can provide a thrust as designed by being rotated, and the position and the attitude of the airframe can be accurately adjusted.

Moreover, in the flight device of the present invention, the main rotor is arranged above a bottom surface of the airframe. Accordingly, in the flight device of the present invention, arranging the main rotor above the bottom surface of the airframe allows the airframe to be stably lifted by using a thrust generated by rotation of the main rotor.

Furthermore, in the flight device of the present invention, a distance between a rotation center of the sub-rotor and a center of the airframe is longer than a distance between a rotation center of the main rotor and the center of the airframe. Accordingly, in the flight device of the present invention, securing a long distance between the rotation center of the sub-rotor and the center of the airframe allows the position and the attitude of the airframe to be accurately controlled by using a thrust generated by rotation of the sub-rotor.

Moreover, in the flight device of the present invention, the main rotor includes a first main rotor and a second main rotor, the sub-rotor includes a first sub-rotor, a second sub-rotor, a third sub-rotor, and a fourth sub-rotor, the first main rotor is arranged on a left side of the airframe, the second main rotor is arranged on a right side of the airframe, the first sub-rotor is arranged on a front-left side of the airframe, the second sub-rotor is arranged on a rear-left side of the airframe, the third sub-rotor is arranged on a front-right side of the airframe, and the fourth sub-rotor is arranged on a rear-right side of the airframe. Accordingly, in the flight device of the present invention, arranging the first main rotor and the second main rotor at positions where the airframe is provided between the first main rotor and the second main rotor allows the airframe to be lifted more stably. Moreover, arranging the first sub-rotor to the fourth sub-rotor in the respective front, rear, left, and right corners allows the position and the attitude of the airframe to be more accurately controlled.

MODE FOR CARRYING OUT THE INVENTION

Figure 1:
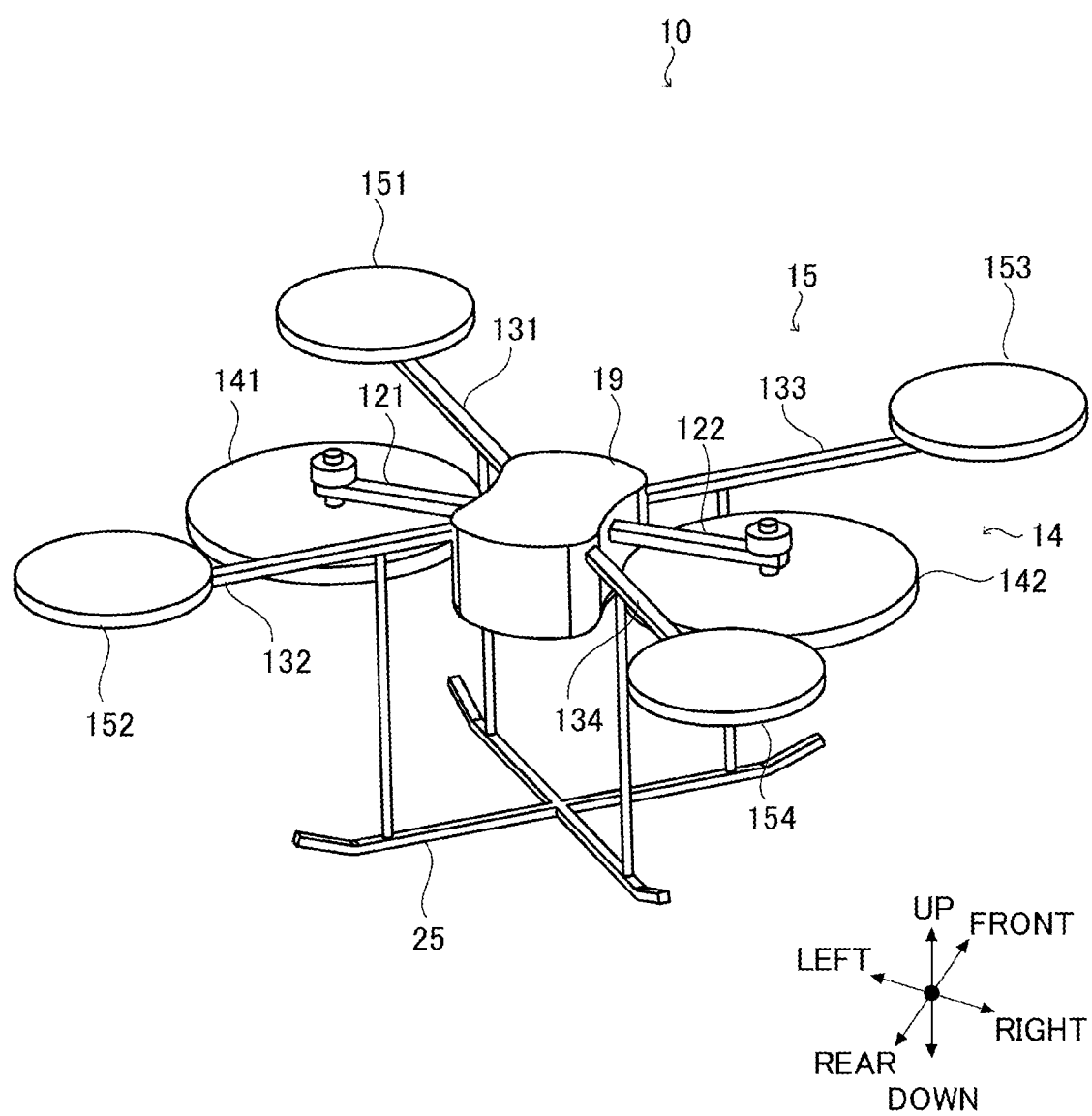
FIG. 1 is a perspective view illustrating a flight device according to an embodiment of the present invention.

A configuration of a flight device of the present embodiment is described below with reference to the drawings. In the following description, parts with the same configurations are denoted by the same reference numerals, and repeated description is omitted. Note that, although directions of up, down, front, rear, left, and right are used in the following description, these directions are for convenience of description. Moreover, the flight device 10 is also referred to as drone.

FIG. 1 is a perspective view illustrating the flight device 10.

The flight device 10 includes an airframe 19, main rotors 14, and an engine 30. Since the engine 30 is housed in the airframe 19, the engine 30 is not illustrated. The flight device 10 is a parallel hybrid drone including two parallel drive systems of an electric drive system and a mechanical drive system. The electric drive system is a drive system that rotates motors 21 and sub-rotors 15 to be described later. The mechanical drive system is a drive system that rotates the main rotors 14.

The airframe 19 is a main body that supports various devices forming the flight device 10, and is made of a synthetic resin, a metal, or a composite material of the synthetic resin and the metal. Although not illustrated herein, the engine 30, power generators 16, a battery 18, and the like are arranged inside the airframe 19.

The main rotors 14 rotate to generate drive force that causes the airframe 19 to lift. The main rotors 14 include a main rotor 141 and a main rotor 142. In this case, for example, the main rotor 141 is a first main rotor, and the main rotor 142 is a second main rotor.

The main rotor 141 is arranged on the left side of the airframe 19. The main rotor 141 is connected to the airframe 19 via a main frame 121.

The main rotor 142 is arranged on the right side of the airframe 19. The main rotor 142 is connected to the airframe 19 via a main frame 122.

The rotating directions of the main rotor 141 and the main rotor 142 are opposite to each other, and the main rotor 141 and the main rotor 142 rotate at the same rotating speed. Moreover, the main rotor 141 and the main rotor 142 are mechanically connected to the engine 30 housed in the airframe 19. For example, the main rotor 141 and the main rotor 142 are mechanically connected to the engine 30 housed in the airframe 19 via belts, power transmission rods, gears, or the like.

The flight device 10 includes the sub-rotors 15. The sub-rotors 15 include a sub-rotor 151 to a sub-rotor 154. In this description, a first sub-rotor is the sub-rotor 151, a second sub-rotor is the sub-rotor 152, a third sub-rotor is the sub-rotor 153, and a fourth sub-rotor is the sub-rotor 154.

The sub-rotor 151 is arranged on the front-left side of the airframe 19, is connected to the airframe 19 via a sub-frame 131, and is rotated by a motor 211 not illustrated herein.

The sub-rotor 152 is arranged on the rear-left side of the airframe 19, is connected to the airframe 19 via a sub-frame 132, and is rotated by a motor 212 not illustrated herein.

The sub-rotor 153 is arranged on the right-front side of the airframe 19, is connected to the airframe 19 via a sub-frame 133, and is rotated by a motor 213 not illustrated herein.

The sub-rotor 154 is arranged on the right-rear side of the airframe 19, is connected to the airframe 19 via a sub-frame 134, and is rotated by a motor 214 not illustrated herein.

In this case, the sub-frame 131 to the sub-frame 134 are formed to be longer than the main frame 121 and the main frame 122. The rotation centers of the sub-rotor 151 to the sub-rotor 154 are thereby farther away from a center portion of the airframe 19 than the rotation centers of the main rotor 141 and the main rotor 142 are. Control of the position and the attitude of the flight device 10 with the sub-rotor 151 to the sub-rotor 154 can be thereby performed more accurately.

A ground contact part 25 is a portion that comes into contact with a landing surface when the flight device 10 lands. The ground contact part 25 is formed by combining multiple frames like the main frame 121 and the like.

Figure 2:
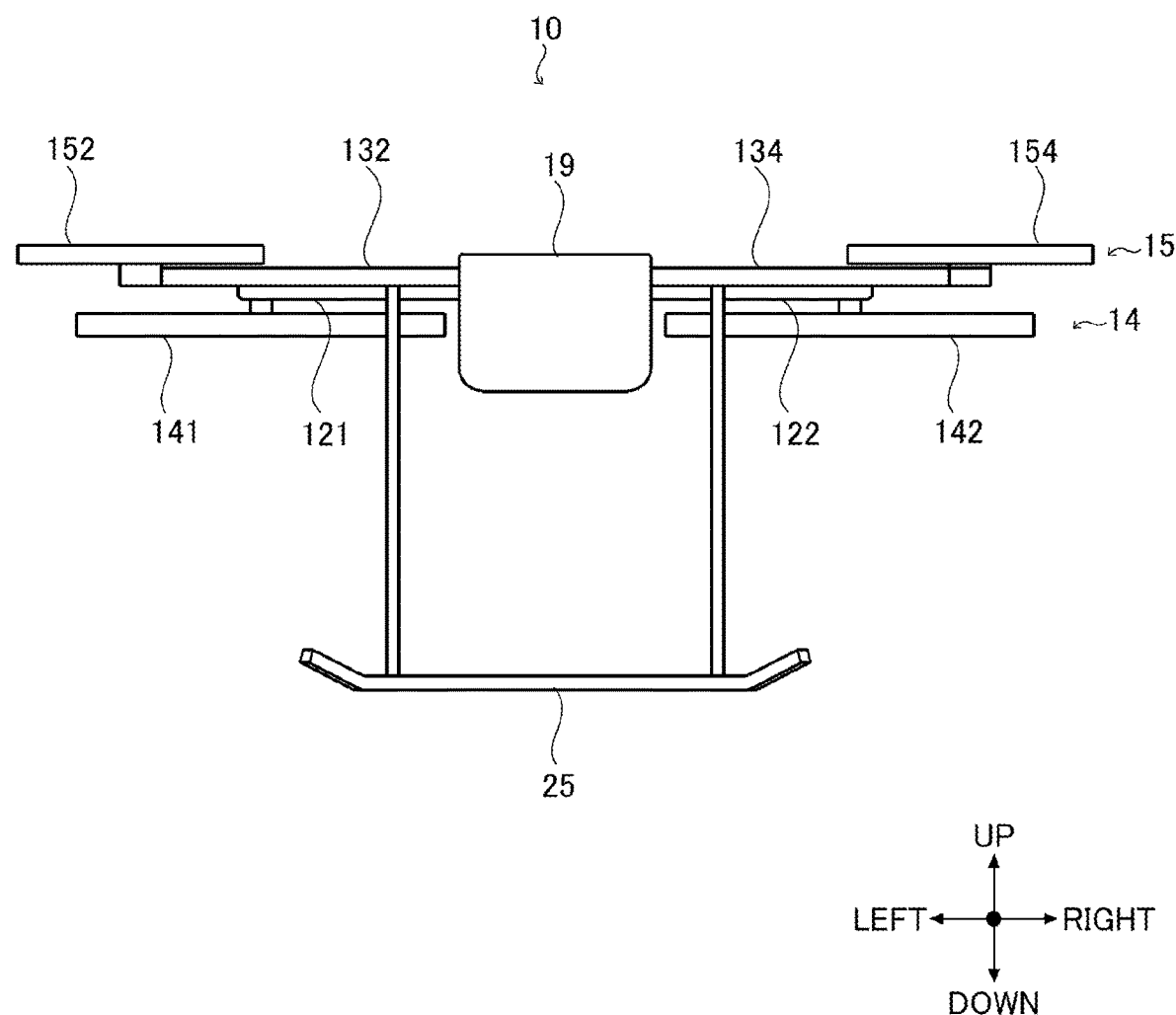
FIG. 2 is a rear view illustrating the flight device according to the embodiment of the present invention.

FIG. 2 is a rear view in which the flight device 10 is viewed from behind. With reference to FIG. 2, the main rotors 14 are arranged below the sub-rotors 15. In this case, the main rotor 141 and the main rotor 142 are arranged below the sub-rotor 152 and the sub-rotor 154.

Arranging the main rotors 14 below the sub-rotors 15 allows the control of the position and the attitude of the flight device 10 with the sub-rotors 15 to be performed more accurately. Specifically, the main rotors 14 rotate at high speed to lift the entire flight device 10 into the air. When the main rotors 14 rotate at high speed, downwash is generated below the main rotors 14. Particularly, since the diameter of the main rotors 14 is larger than that of the sub-rotors 15, strong downwash is generated. In this case, downwash is wind generated by air that is sucked in from above the main rotors 14 and blown downward by the rotation of the main rotors 14 when the flight device 10 is in flight, and spreads in a fan shape while flowing downward.

In the present embodiment, since the main rotors 14 are arranged below the sub-rotors 15, the downwash generated by the rotation of the main rotors 14 does not greatly affect the sub-rotors 15. Accordingly, the position and the attitude of the flight device 10 in the air can be set to predetermined position and attitude by causing each sub-rotor 15 to rotate at a predetermined rotation speed. Accordingly, an operator not illustrated herein can stably operate the flight device 10.

Moreover, the main rotors 14 are arranged above a bottom surface of the airframe 19. This allows the positions of the main rotors 14 to be set as high as possible, in an area below the sub-rotors 15, and allows the airframe 19 to be stably lifted into the air by thrusts generated by the rotation of the main rotors 14.

Figure 3:
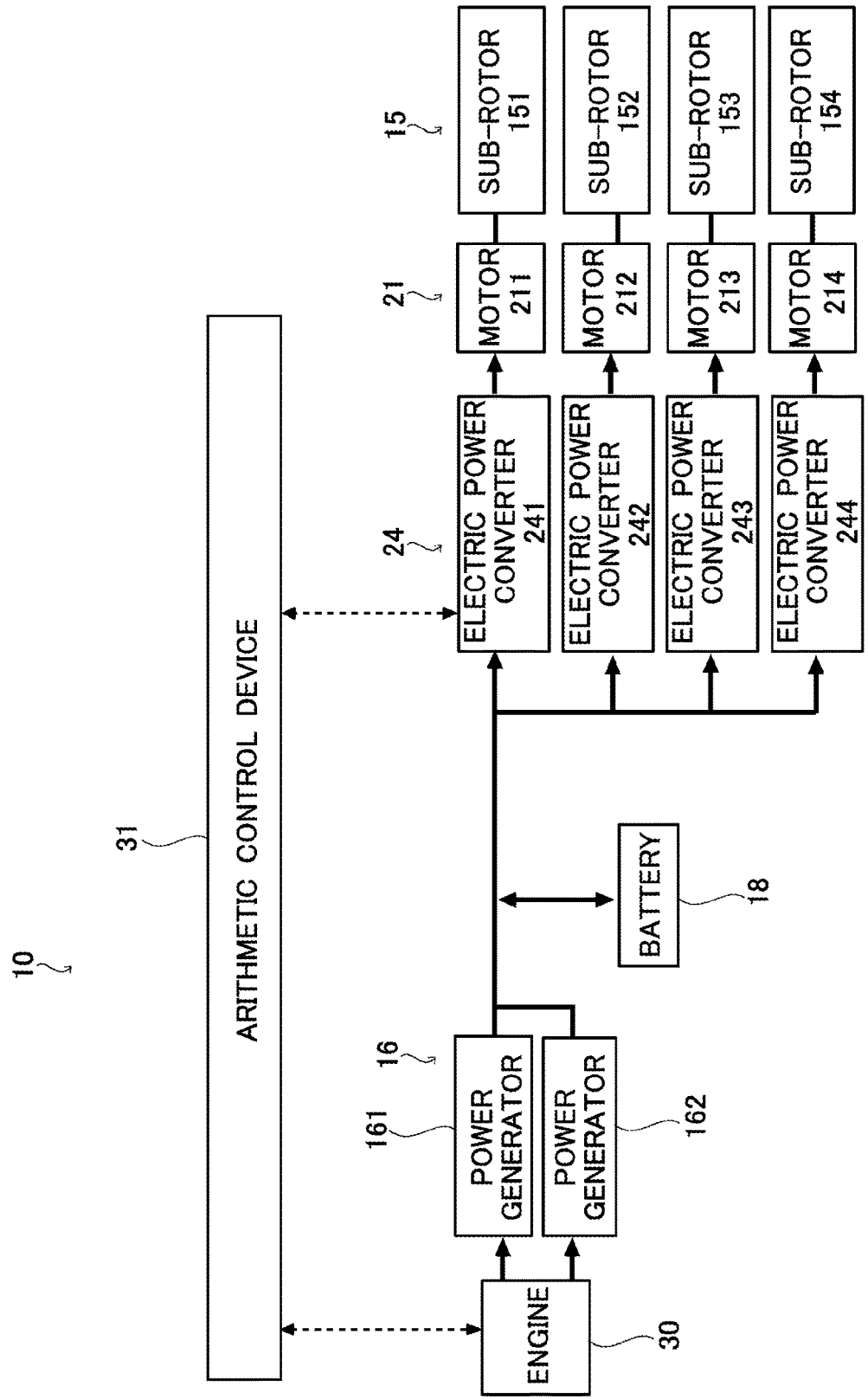
FIG. 3 is a diagram illustrating the flight device according to the embodiment of the present invention, and is a block diagram illustrating a connection configuration of various units.

FIG. 3 is a diagram illustrating the flight device 10, and is a block diagram illustrating a connection configuration of various units.

The flight device 10 includes an arithmetic control unit 31, the engine 30, the power generators 16, the battery 18, electric power converters 24, the motors 21, and the sub-rotors 15.

The arithmetic control unit 31 includes a CPU, a ROM, a RAM, and the like, and controls behaviors of various devices forming the flight device 10 based on inputs from various types of sensors and controllers that are not illustrated herein. Moreover, the arithmetic control unit 31 is also a flight controller that controls the number of revolutions of each of the main rotors 14 and the sub-rotors 15 based on the inputs from the various types of sensors and a remote control device (proportional controller) operated by the operator.

The engine 30 operates based on an input signal from the arithmetic control unit 31, and generates energy for causing the flight device 10 to fly. A specific configuration of the engine 30 is described later with reference to FIG. 3.

The power generators 16 are devices that generate electric power by using part of the drive force of the engine 30, and include a power generator 161 and a power generator 162. The power generator 161 is driven by a first engine part 40 of the engine 30 to be described later. The power generator 162 is driven by a second engine part 41 of the engine 30 to be described later.

The battery 18 is provided between the power generators 16 and the electric power converters 24. The battery 18 is charged by the power generators 16. Electric power discharged from the battery 18 is supplied to the electric power converters 24 to be described later.

The electric power converters 24 are provided to correspond to the respective sub-rotors 15. Converters and Inverters that temporarily convert AC electric power supplied from the power generator 162 to DC electric power and then convert the DC electric power to AC electric power of a predetermined frequency can be adopted as the electric power converters 24. Moreover, inverters that convert DC electric power supplied from the battery 18 to a predetermined frequency can be adopted as the electric power converters 24. Specifically, the electric power converters 24 includes an electric power converter 241, an electric power converter 242, an electric power converter 243, and an electric power converter 244.

The motors 21 are provided to correspond to the respective sub-rotors 15, and include the motor 211, the motor 212, the motor 213, and the motor 214. The motor 211, the motor 212, the motor 213, and the motor 214 rotate at predetermined speeds by using electric power supplied from the electric power converter 241, the electric power converter 242, the electric power converter 243, and the electric power converter 244, respectively.

As described above, the sub-rotors 15 include the sub-rotor 151, the sub-rotor 152, the sub-rotor 153, and the sub-rotor 154. The sub-rotor 151, the sub-rotor 152, the sub-rotor 153, and the sub-rotor 154 are rotated by the motor 211, the motor 212, the motor 213, and the motor 214, respectively.

Operations of the flight device 10 are explained. The flight device 10 operates in a hovering state, an ascending/descending state, or a horizontal movement state.

In the hovering state, the flight device 10 rotates the main rotors 14 by using the drive force generated by the engine 30 based on an instruction from the arithmetic control unit 31, and the flight device 10 is lifted to a predetermined position in the air. In this case, each of the sub-rotors 15 is rotated based on an instruction from the arithmetic control unit 31. The arithmetic control unit 31 sets the rotation speed of each of the motors 21 and the sub-rotors 15 to a predetermined speed by controlling a corresponding one of the electric power converters 24 such that the flight device 10 can maintain predetermined altitude and attitude.

In the ascending/descending state, the flight device 10 ascends or descends by controlling the number of revolutions of the engine 30 to rotate the main rotors 14 at a predetermined speed. Also in this case, the arithmetic control unit 31 sets the rotation speed of each of the motors 21 and the sub-rotors 15 to a predetermined speed by controlling a corresponding one of the electric power converters 24 such that the flight device 10 can maintain predetermined altitude and attitude.

In the horizontal movement state, the arithmetic control unit 31 sets the flight device 10 to a tilted state by controlling each of the electric power converters 24 to control the number of revolutions of a corresponding set of the motor 21 and the sub-rotor 15. Also in this case, the arithmetic control unit 31 rotates the main rotors 14 at a predetermined speed by controlling a drive state of the engine 30.

In the present embodiment, since the main rotors 14 are arranged below the sub-rotors 15 as illustrated in FIG. 2, it is possible to stably control the position and the attitude of the flight device 10 with the sub-rotors 15 in the hovering state, the ascending/descending state, and the horizontal movement state.

Figure 4:
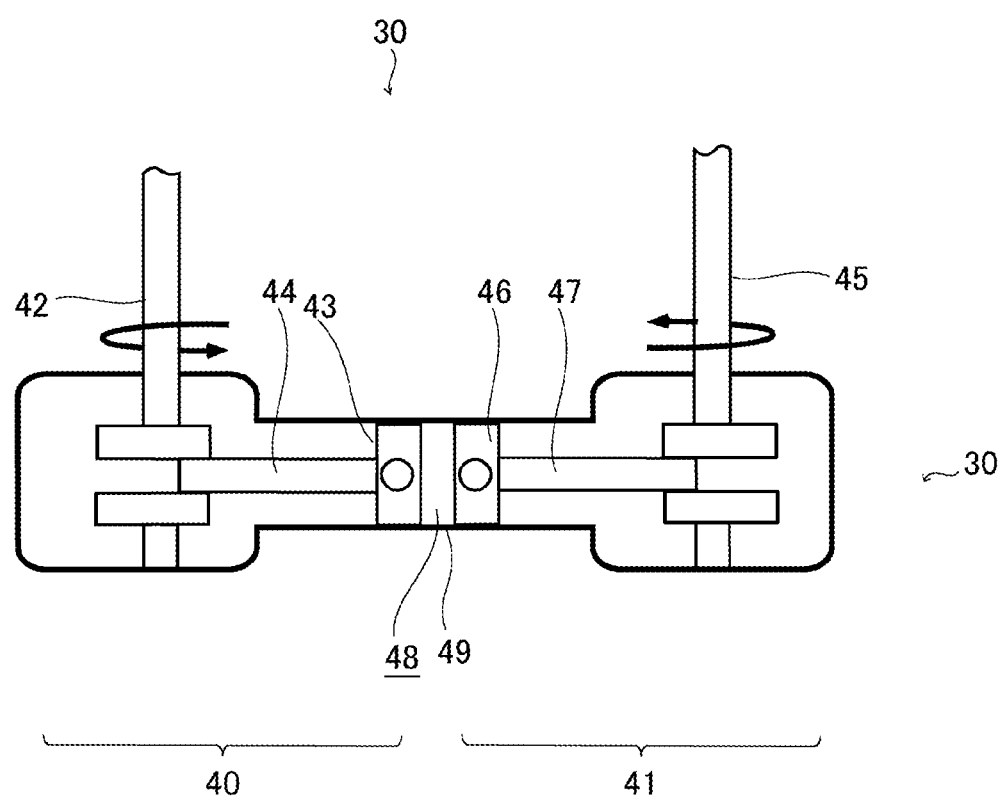
FIG. 4 is a diagram illustrating a configuration and arrangement of an engine in the flight device according to the embodiment of the present invention.

FIG. 4 is a diagram illustrating a configuration and arrangement of the engine 30 in the flight device 10.

The engine 30 includes the first engine part 40 and the second engine part 41. The first engine part 40 and the second engine part 41 are arranged to be opposed to each other, the first engine part 40 is arranged on the left side, and the second engine part 41 is arranged on the right side.

The first engine part 40 includes a first piston 43 configured to reciprocate, a first crankshaft 42 configured to convert a reciprocating motion of the first piston 43 to a rotating motion, and a first connecting rod 44 configured to rotatably link the first piston 43 and the first crankshaft 42 to each other.

The second engine part 41 includes a second piston 46 configured to reciprocate, a second crankshaft 45 configured to convert a reciprocating motion of the second piston 46 to a rotating motion, and a second connecting rod 47 configured to rotatably link the second piston 46 and the second crankshaft 45 to each other.

The first piston 43 of the first engine part 40 and the second piston 46 of the second engine part 41 share a combustion chamber 48. In other words, the first piston 43 and the second piston 46 reciprocate inside one communicating cylinder. Accordingly, it is possible to reduce a stroke amount and achieve a high expansion ratio of a mixture gas in the combustion chamber 48 by causing the first engine part 40 and the first piston 43 to simultaneously stroke toward a center portion.

Although not illustrated herein, a volume space communicating with the combustion chamber 48 is formed in the engine 30, and a spark plug is arranged in this volume space. Moreover, an intake port and an exhaust port that are not illustrated herein are formed in the combustion chamber 48. An air-fuel mixture including fuel such as gasoline is introduced into the combustion chamber 48 from the intake port, and an exhaust gas after combustion is exhausted from the combustion chamber to the outside via the exhaust port.

The engine 30 with the above-mentioned configuration operates as follows. First, in an intake stroke, the first piston 43 and the second piston 46 move inside a cylinder 49 from a center portion toward the outer sides to introduce the air-fuel mixture being a mixture of fuel and air into the cylinder 49. Next, in a compression stroke, the first piston 43 and the second piston 46 are pushed toward the center portion by inertia of the rotating first crankshaft 42 and second crankshaft 45, and the air-fuel mixture is compressed inside the cylinder 49. Next, in a combustion stroke, the not-illustrated spark plug ignites the air-fuel mixture in the combustion chamber 48, and the air-fuel mixture combusts inside the cylinder 49. This causes the first piston 43 and the second piston 46 to be pushed to outer end portions which are bottom dead centers. Then, in an exhaust stroke, the first piston 43 and the second piston 46 are pushed toward the inner side by the inertia of the rotating first crankshaft 42 and second crankshaft 45, and the gas that is present inside the cylinder 49 after the combustion is exhausted to the outside.

In the engine 30, the stroke can be divided between two pistons of the first piston 43 and the second piston 46 that reciprocate inside one cylinder 49. Accordingly, a compression ratio of the mixture gas can be set higher than that in a normal gasoline engine. Moreover, since the first piston 43 and the second piston 46 are opposed to each other inside the cylinder 49, a cylinder head necessary in a general engine is unnecessary, and the configuration of the engine 30 is simple and lightweight. Furthermore, the members forming the engine 30, specifically, the first piston 43, the second piston 46, the first crankshaft 42, the second crankshaft 45, and the like are arranged to be opposed to one another and operate in an opposed manner. Accordingly, vibrations generated by the members of the engine 30 are cancelled out, and a vibration generated from the entire engine 30 to the outside can be reduced. Thus, mounting the engine 30 with such a structure in the flight device 10 can achieve size reduction, weight reduction, and vibration reduction of the flight device 10. Particularly, reducing the vibration can prevent adverse effects on arithmetic control devices for attitude control, motor output control, and the like and on precision equipment such as a GPS sensor. Moreover, it is possible to prevent breakage of a delivered cargo transported by the flight device 10 due to vibration.

The first crankshaft 42 is drivingly connected to the main rotor 141 illustrated in FIG. 1, and the second crankshaft 45 is drivingly connected to the main rotor 142 illustrated in FIG. 1. Such driving connection is achieved by, for example, a transmission rod, a belt, or a gear.

The present embodiment described above can have the following main effects.

With reference to FIG. 2, arranging the main rotors 14 below the sub-rotors 15 prevents the sub-rotors 15 from being affected by an air flow generated by the rotation of the main rotors 14. Accordingly, the sub-rotors 15 can provide thrusts as designed by being rotated, and the position and the attitude of the airframe 19 can be accurately adjusted.

With reference to FIG. 2, in the flight device 10 of the present invention, arranging the main rotors 14 above the bottom surface of the airframe 19 allows the airframe 19 to be stably lifted by the thrusts generated by the rotation of the main rotors 14.

With reference to FIG. 1, in the flight device 10 of the present embodiment, securing a long distance between the rotation center of each sub-rotor 15 and the center of the airframe 19 allows the position and the attitude of the airframe 19 to be accurately controlled by using the thrusts generated by the rotation of the sub-rotors 15.

With reference to FIG. 1, arranging the main rotor 141 and the main rotor 142 at positions where the airframe 19 is provided between the main rotor 141 and the main rotor 142 allows the airframe 19 to be stably lifted. Moreover, arranging the sub-rotor 151 to the sub-rotor 154 at the respective front, rear, left, and right corners allows the position and the attitude of the airframe 19 to be more accurately controlled.

Although the embodiment of the present invention has been described above, the present invention is not limited to this embodiment, and changes can be made within a scope not departing from the gist of the present invention. Moreover, the modes described above can be combined with one another.

With reference to FIG. 4, in the engine 30, the first engine part 40 and the second engine part 41 share the combustion chamber 48. However, combustion spaces may be formed individually for the first engine part 40 and the second engine part 41. Furthermore, in the case where the combustion spaces are formed individually for the first engine part 40 and the second engine part 41, such combustion spaces may be arranged in outer end portions in the width direction.

An invention that can be grasped from the above-mentioned present embodiment is described below together with effects of this invention.

A flight device of the present invention includes an airframe, an engine, a motor, a main rotor, and a sub-rotor, the engine rotates the main rotor, the motor rotates the sub-rotor, and the main rotor is arranged below the sub-rotor. Accordingly, in the flight device of the present invention, arranging the main rotor below the sub-rotor prevents the sub-rotor from being affected by an air flow generated by rotation of the main rotor. Thus, the sub-rotor can provide a thrust as designed by being rotated, and the position and the attitude of the airframe can be accurately adjusted.

Moreover, in the flight device of the present invention, the main rotor is arranged above a bottom surface of the airframe. Accordingly, in the flight device of the present invention, arranging the main rotor above the bottom surface of the airframe allows the airframe to be stably lifted by using a thrust generated by the rotation of the main rotor.

Furthermore, in the flight device of the present invention, a distance between a rotation center of the sub-rotor and a center of the airframe is longer than a distance between a rotation center of the main rotor and the center of the airframe. Accordingly, in the flight device of the present invention, securing a long distance between the rotation center of the sub-rotor and the center of the airframe allows the position and the attitude of the airframe to be accurately controlled by using a thrust generated by the rotation of the sub-rotor.

Moreover, in the flight device of the present invention, the main rotor includes a first main rotor and a second main rotor, the sub-rotor includes a first sub-rotor, a second sub-rotor, a third sub-rotor, and a fourth sub-rotor, the first main rotor is arranged on a left side of the airframe, the second main rotor is arranged on a right side of the airframe, the first sub-rotor is arranged on a front-left side of the airframe, the second sub-rotor is arranged on a rear-left side of the airframe, the third sub-rotor is arranged on a front-right side of the airframe, and the fourth sub-rotor is arranged on a rear-right side of the airframe. Accordingly, in the flight device of the present invention, arranging the first main rotor and the second main rotor at positions where the airframe is provided between the first main rotor and the second main rotor allows the airframe to be lifted more stably. Moreover, arranging the first sub-rotor to the fourth sub-rotor in the respective front, rear, left, and right corners allows the position and the attitude of the airframe to be more accurately controlled.

EXPLANATION OF THE REFERENCE NUMERALS

10 flight device
121 main frame
122 main frame
131 sub-frame
132 sub-frame
133 sub-frame
134 sub-frame 14 main rotor
141 main rotor
142 main rotor
15 sub-rotor
151 sub-rotor
152 sub-rotor
153 sub-rotor
154 sub-rotor
16 power generator
161 power generator
162 power generator
18 battery
19 airframe
21 motor
211 motor
212 motor
213 motor
214 motor
24 electric power converter
241 electric power converter
242 electric power converter
243 electric power converter
244 electric power converter
25 ground contact part
30 engine
31 arithmetic control unit
40 first engine part
41 second engine part
42 first crankshaft
43 first piston
44 first connecting rod
45 second crankshaft
46 second piston
47 second connecting rod
48 combustion chamber
49 cylinder

The invention claimed is:

1. A flight device comprising:
an airframe;
an engine;
a motor;
a main rotor; and
a sub-rotor, wherein
the engine rotates the main rotor,
the motor rotates the sub-rotor, and
the main rotor is arranged below the sub-rotor, the main rotor includes a first main rotor and a second main rotor,
the first main rotor is arranged at a position not overlapping the airframe, on a left side of the airframe, and
the second main rotor is arranged at a position not overlapping the airframe, on a right side of the airframe.

2. The flight device according to claim 1, wherein the main rotor is arranged above a bottom surface of the airframe.

3. The flight device according to claim 1, wherein a distance between a rotation center of the sub-rotor and a center of the airframe is longer than a distance between a rotation center of the main rotor and the center of the airframe.

4. The flight device according to claim 1, wherein
the sub-rotor includes a first sub-rotor, a second sub-rotor, a third sub-rotor, and a fourth sub-rotor,
the first sub-rotor is arranged on a front-left side of the airframe,
the second sub-rotor is arranged on a rear-left side of the airframe,
the third sub-rotor is arranged on a front-right side of the airframe, and
the fourth sub-rotor is arranged on a rear-right side of the airframe.

5. The flight device according to claim 1, wherein the main rotor and the sub-rotor are arranged at positions where the main rotor and the sub-rotor do not overlap each other.

6. A flight device comprising:
an airframe;
an engine;
a motor;
a main rotor; and
a sub-rotor, wherein
the engine rotates the main rotor,
the motor rotates the sub-rotor,
the main rotor is arranged below the sub-rotor, the main rotor includes a first main rotor and a second main rotor, and is arranged above a bottom surface of the airframe,
the first main rotor is arranged at a position not overlapping the airframe, on a left side of the airframe,
the second main rotor is arranged at a position not overlapping the airframe, on a right side of the airframe, and
a distance between a rotation center of the sub-rotor and a center of the airframe is longer than a distance between a rotation center of the main rotor and the center of the airframe.

\* \* \* \* \*